US006574527B1

(12) United States Patent
Courtney et al.

(10) Patent No.: US 6,574,527 B1
(45) Date of Patent: Jun. 3, 2003

(54) METHOD OF SELECTING A CUTTING SYSTEM

(75) Inventors: James C. Courtney, Jeannette, PA (US); Daniel C. Statler, Greensburg, PA (US); Kenneth J. Topka, Cairnbrook, PA (US); Gerald L. Woods, Bedford, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/680,009

(22) Filed: Oct. 5, 2000

(51) Int. Cl.[7] .............................................. G06F 19/00
(52) U.S. Cl. ...................................................... 700/179
(58) Field of Search ................................ 700/179, 180, 700/160

(56) References Cited

U.S. PATENT DOCUMENTS

| 3,650,565 A | 3/1972 | Kniff |
| 3,685,022 A | 8/1972 | Raynes |
| 3,830,321 A | 8/1974 | McKenry et al. |
| 4,141,133 A | 2/1979 | Grinage |
| 4,477,211 A | 10/1984 | Briese |
| 4,547,854 A | 10/1985 | Hashimoto et al. |
| 4,549,270 A | * 10/1985 | Fukumura et al. ............. 483/5 |
| 4,591,989 A | * 5/1986 | Tanaka ...................... 700/176 |
| 4,631,465 A | 12/1986 | Fukuyama et al. |
| 4,685,850 A | 8/1987 | Ohta et al. |
| 4,739,488 A | * 4/1988 | Asakura ....................... 483/5 |
| 4,836,614 A | 6/1989 | Ojanen |
| 4,893,967 A | 1/1990 | Briese |
| 4,896,273 A | * 1/1990 | Moore et al. ............... 700/179 |
| 5,061,887 A | * 10/1991 | Miyata et al. .............. 318/567 |
| 5,067,775 A | 11/1991 | D'Angelo |
| 5,098,167 A | 3/1992 | Latham |
| 5,248,924 A | * 9/1993 | Niwa .......................... 318/569 |
| 5,249,135 A | * 9/1993 | Fujita .......................... 700/179 |
| 5,257,199 A | 10/1993 | Tsujino et al. |
| 5,378,218 A | 1/1995 | Daimaru et al. |
| 5,798,928 A | * 8/1998 | Niwa .......................... 700/180 |
| 5,933,353 A | * 8/1999 | Abriam et al. .............. 700/171 |
| 5,956,487 A | * 9/1999 | Venkatraman et al. ....... 340/3.1 |
| 5,975,811 A | 11/1999 | Briese |
| 6,102,486 A | 8/2000 | Briese |

* cited by examiner

Primary Examiner—Emanuel Todd Voeltz
Assistant Examiner—Edward F. Gain, Jr.
(74) Attorney, Agent, or Firm—Larry R. Meenan

(57) ABSTRACT

A tiered level cutting system and method that guides a user through the process of selecting an appropriate tool or adapter for specific cutting conditions and/or applications. The cutting system may include a plurality of blocks, one or more sleeves for each block, and a plurality of cutting tools. The method includes the steps of selecting a block for a user's particular operation, optionally, selecting a sleeve based on the selected block, and selecting a cutting tool based on the selected sleeve. The cutting system is selected based upon the type of machinery and cutting environment. The block is selected based upon the particular operation. Operation categories may include severe, heavy, medium and light based upon conditions. The cutting tool is selected based upon the shape and carbide content. The steps can be performed in most any suitable order.

14 Claims, 9 Drawing Sheets

METHOD OF SELECTING A CUTTING SYSTEM

FIELD OF THE INVENTION

The present invention pertains to a method of selecting a cutting system to be used in mining and construction operations. More particularly, the present invention relates to a tiered level system and method that guides a user through the process of selecting the appropriate components for a specific cutting condition or application such as in mining and construction applications. This process is particularly applicable to e-commerce type applications.

BACKGROUND OF THE INVENTION

Figure 10:
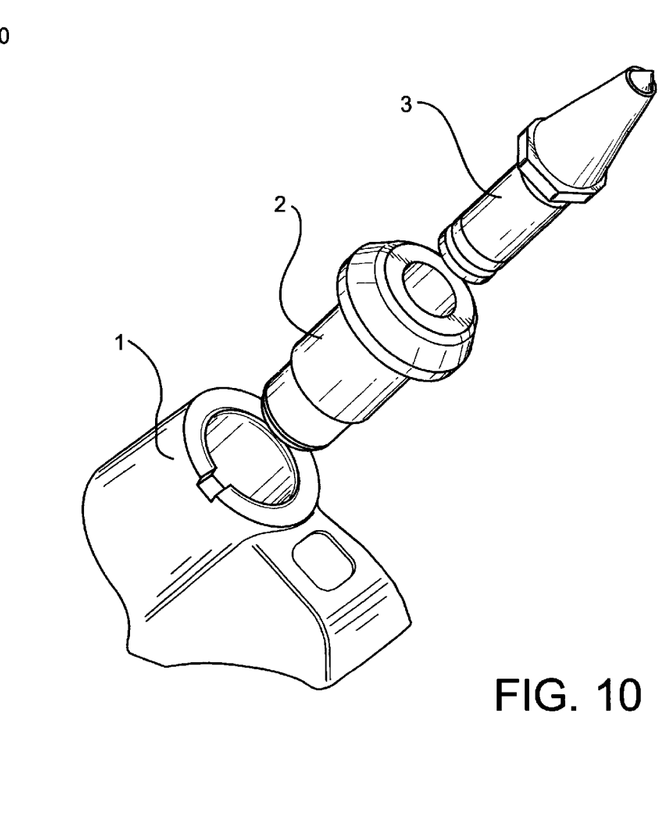
FIG. 10 is a perspective view of a cutting system in accordance with the invention.

Cutting systems for mining or construction applications typically comprise a cutting tool 3, sometimes referred to as a cutting pick, rotatably mounted within a sleeve 2 within a support block 1. An example of a cutting system is shown in FIG. 10. The support block 1 in turn is mounted onto a drum or other body, typically by welding, which in turn is driven by a suitable drive means. When a number of such support blocks carrying cutting tools are mounted onto a drum, and the drum is driven, the cutting tools will engage and break up the material sought to be mined or removed. The general operation of such a mining or construction machine is well known in the art.

As used herein cutting tool refers to a wear resistant element used for machining, cutting, drilling, pulverizing, impacting or scraping a work piece. Known wear resistant elements include cemented carbide pieces, cermets and ceramics and the like as well known in the art.

It will be appreciated that to specify an appropriate cutting tool for a particular mining operation, it is necessary for an operator to understand the relationships between the block, sleeve and the cutting tools and the material to be worked. With the large number of available cutting tools and cutting tool systems and varying cutting conditions, it is extremely difficult for an operator to configure the optimum system for a particular operation.

In the past, an operator was required to search through a catalog with illustrations of blocks, sleeves and cutting tools and little or no information about the optimum operating parameters of the blocks, sleeves and cutting tools for a particular operation. This method consumes much time and labor to design the required cutting tool system and may result in specifying an inefficient cutting tool system for a particular application. Thus, it would be desirable to provide a selection system and method that enables the user to design a cutting system tailored to the user's specific equipment and cutting environment.

SUMMARY OF THE INVENTION

An aspect of the invention is to provide a tiered tool cutting system that guides a user through the process of selecting an appropriate tool or adapter for specific cutting conditions and/or applications.

It is another aspect of the invention to provide a system and method that enables a user to design a cutting system.

In one aspect of the invention, a method for selecting a tool by displaying tool data comprising an alphanumeric code for identifying a specific tool, the method comprises the steps of:

setting and registering tool criteria for a tool appropriate for a particular application;

arranging and displaying the tool data in accordance with the set criteria; and selecting the desired tool data from among the tool data displayed based upon the tool criteria.

In another aspect of the invention, a method of selecting a tool for mining and construction applications based upon a predetermined criteria comprises the steps of:

selecting either a block, sleeve or cutting tool from a cutting system based upon the predetermined criteria, the cutting system including a plurality of blocks, sleeves and cutting tools; and selecting a tool from the cutting system based on the selected block.

In yet another aspect of the invention, a system for selecting a cutting tool for a particular operation comprises:

a plurality of blocks, each block based on a particular operation;

a plurality of sleeves for each block; and a plurality of cutting tools for each sleeve, wherein the plurality of cutting tools are categorized according to a plurality of operation categories.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
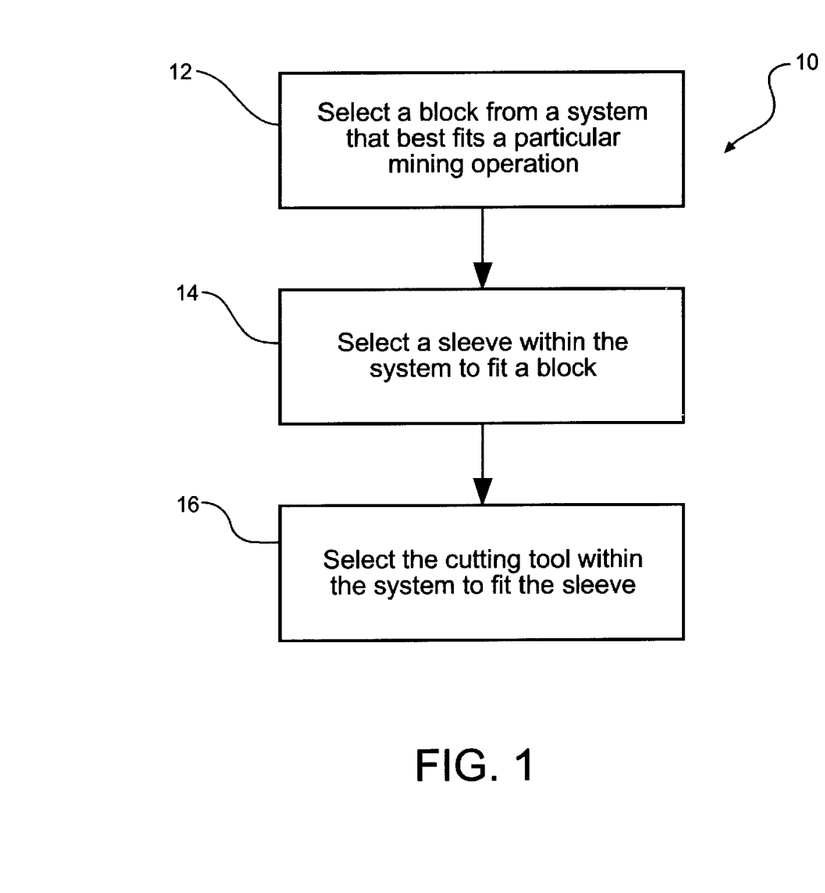
FIG. 1 is a flow chart of the method of selecting a cutting tool or drill bit in accordance with the invention.

A method of selecting a cutting system including a cutting tool by displaying tool data consisting of an alphanumeric code and at least tool shape for identifying a specific tool is shown in FIG. 1.

In general, the method comprises the steps of setting and registering tool criteria for a tool appropriate for a particular application, arranging and displaying the tool data in accordance with the set criteria, then selecting the desired tool data from among the tool data displayed based upon the tool criteria.

The tool criteria for a particular application can be set by arranging a plurality of alphanumeric codes in a cutting system corresponding to a type of machinery. The cutting system can be stored in data base format in any suitable electronic media, such as a memory storage device, microprocessor, controller, PLC, RAM, ROM, ASIC, CDROM, DVD, and the like. The tool criteria can be registered by creating a database containing a tiered level of the alphanumeric codes. The registered alphanumeric codes can be displayed by the user on a CRT device by viewing an Internet web page, reading the CDROM, DVD, or printing or inscribing the cutting system of alphanumeric codes on hard copy paper output, or by any other suitable means known in the art.

By definition, a cutting system is a system comprising blocks, sleeves and tools that are available for a user's type of machinery. Because the cutting system is based on the user's type of machinery, it will be appreciated that the method of the invention is not limited by the number of cutting systems, and that the invention can be practiced with any desired number of cutting systems.

It will be appreciated that the method of the invention is not limited by the number of cutting tools, blocks and/or sleeves, and that the invention can be practiced with any desired number of cutting tools, blocks and/or sleeves based upon the operating conditions of the cutting system and the machine.

Figure 2:
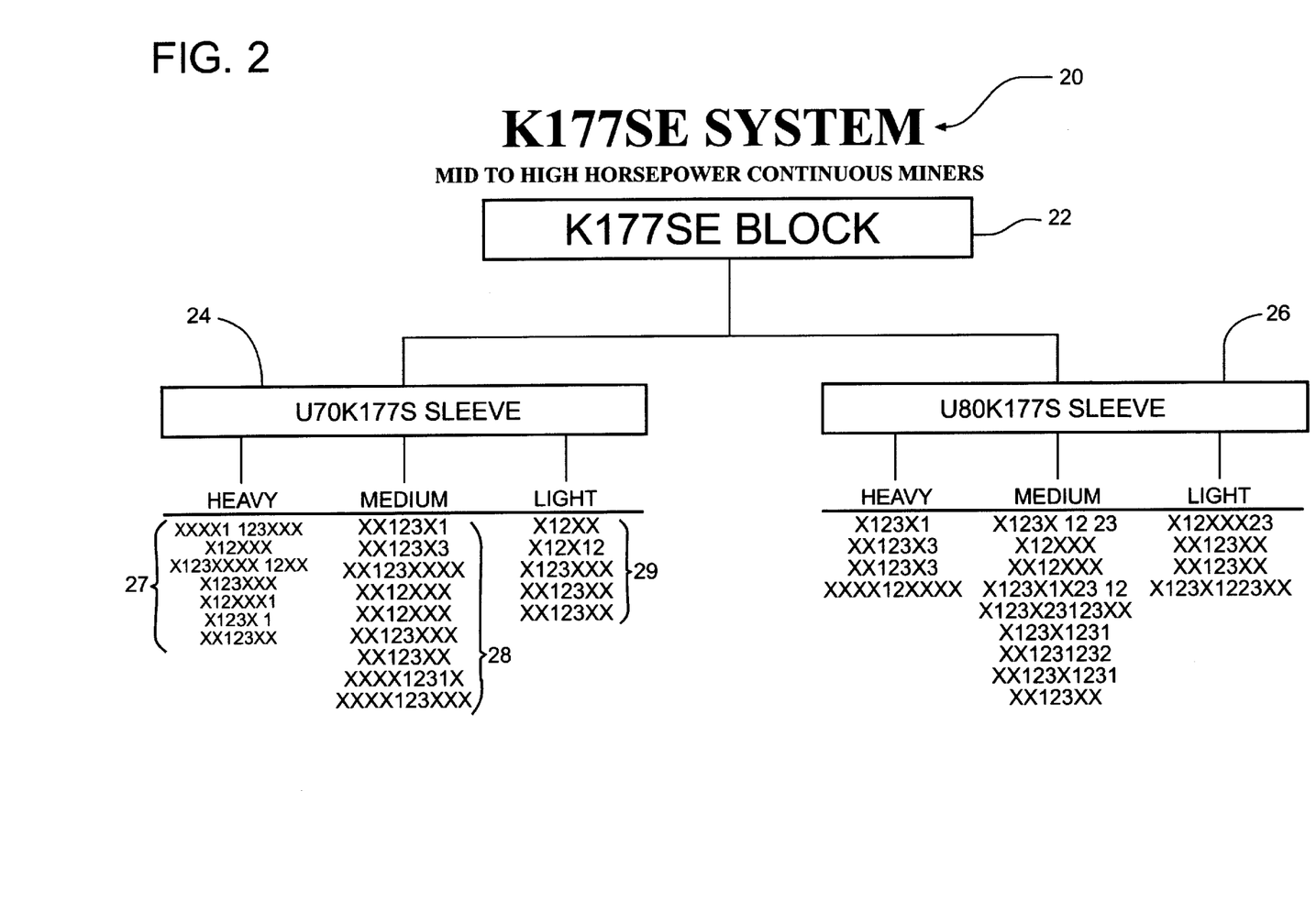
FIGS. 2–9 are schematic diagrams of tool cutting systems in accordance with the invention.

Examples of the method of the invention are illustrated in FIGS. 2–9. For example, FIG. 2 illustrates a cutting system 20, designated with an alphanumeric code K177SE, for a medium-to-high horsepower continuous miner type of machinery. It will be appreciated that although the cutting system is illustrated with reference to mining applications, the present invention is equally applicable to construction applications.

First, the user selects a block that best fits a user's particular mining operation. The mining operation includes the machine on which the blocks will be mounted and the material to be worked. For example, the user may select a block 22, designated with an alphanumeric code K177SE. As shown in FIG. 2, only one block 22 is available for selection in the K177SE system. However, it will be appreciated that the invention is not limited by the number of blocks in the system, and that the invention can be practiced with any desired number of blocks within a cutting system.

Next, the user then selects a sleeve from one or more sleeves 24, 26 to fit the selected block 22. For example, the user may select the sleeve 24 designated with an alphanumeric code U70K1177S to fit that particular block based on the diameter of the cutting tool 27, 28, 29. Alternatively, the user may select the sleeve 26 designated with an alphanumeric code U80K177S. As shown in FIG. 2, two sleeves 24, 26 are available for the selected block 22. However, it will be appreciated that the invention is not limited by the number of sleeves available for each block, and that the invention can be practiced with any desired number of sleeves within a block.

Lastly, the user then selects the cutting tool that fits the selected sleeve. The selection of the appropriate cutting tool may be based on several factors, such as the cost of the cutting tool, the shape and size of the cutting tool, the severity of the conditions in which the cutting tool will be used for the user's particular application, and the composition of the cutting tool.

As shown in FIG. 2, there are three operation categories for each sleeve 24, 26: HEAVY, MEDIUM and LIGHT. When the user's particular operation involves cutting high-density substances, such as rock, granite, sandstone, limestone, and the like, the user can select one of the cutting tools 27 designated under the HEAVY operation category. For example, the user may select the cutting tool designated with an alphanumeric code U76KHD under the HEAVY operation category based on the shape and composition of the cutting tool for the user's particular application. To assist the operator in selecting the cutting tool for a particular mining operation category, each mining operation category can be color coded to correspond to a color of the cutting tool.

When the mining operation involves cutting medium-density substances, such as porous rock, coal, trona, and the like, the user selects one of the cutting tools 28 designated under the MEDIUM operation category. For example, the user may select the cutting tool designated with an alphanumeric code UC70TLR under the MEDIUM operation category.

When the mining operation involves drilling low-density substances, such as loamy soil, sand, gypsum, and the like, the user selects one of the cutting tool 29 designated under the LIGHT operation category. For example, the user may select the cutting tool designated with an alphanumeric code U76KP under the LIGHT operation category.

As shown in FIG. 2, three mining operation categories are available for each sleeve 24, 26. However, it will be appreciated that the invention is not limited by the number of mining operation categories available for each sleeve, and that the invention can be practiced with any desired number of mining operation categories for a sleeve.

Once the desired cutting tool 27, 28, 29 is selected from a particular operation category based on the selected sleeve 24, 26 and the selected block 22, the user has configured a block/sleeve/cutting tool system that best fits that user's particular operation in accordance with the method of the invention.

It will be appreciated that the method of the invention is not limited by the number of cutting systems, and that the invention can be practiced with any desired number of cutting systems.

Figure 3:
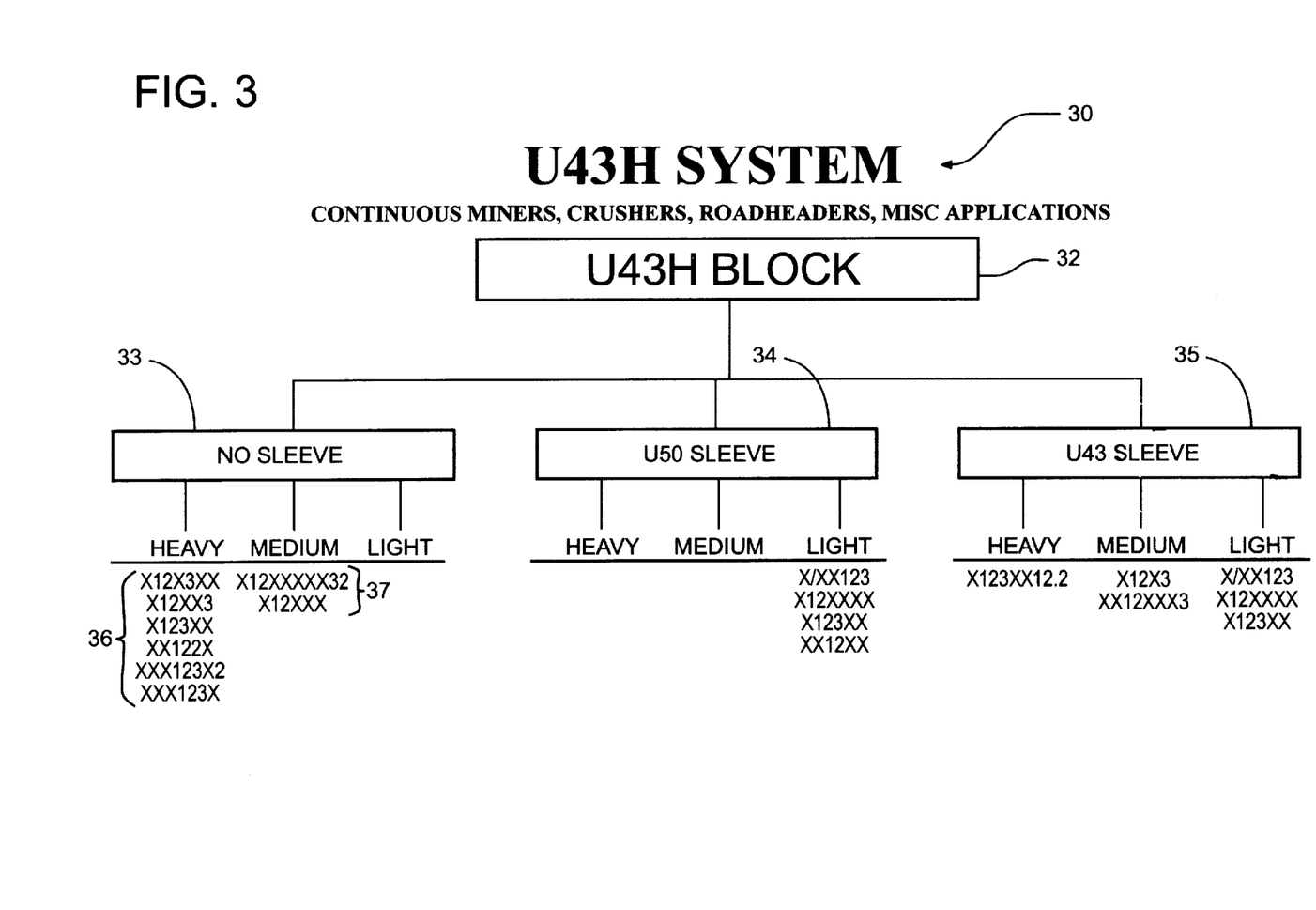

FIG. 3 shows another example of a cutting system 30, designated with an alphanumeric code U43H, for continuous mining, crushers, roadheaders, and miscellaneous applications. In the U43H system, the user may select the block 32, designated with an alphanumeric code U43H. Next, the user may select NO SLEEVE 33, or one of two different sleeves 34, 35, designated as U50 and U43, that fit the U43H block 32.

It should be noted that if the user selects the NO SLEEVE 33 as the appropriate sleeve, then only cutting tools 36, 37 for the HEAVY or MEDIUM operation categories can be selected, respectively. On the other hand, if the user selects the sleeve designated with an alphanumeric code U50, then only cutting tools for the LIGHT operation category can be selected.

However, it will be appreciated that the invention is not limited to the selections available to the user for a particular cutting system, and that the invention can be practiced by adding and/or deleting blocks, sleeves, cutting tools and operation categories that can be selected by the user.

Figure 4:
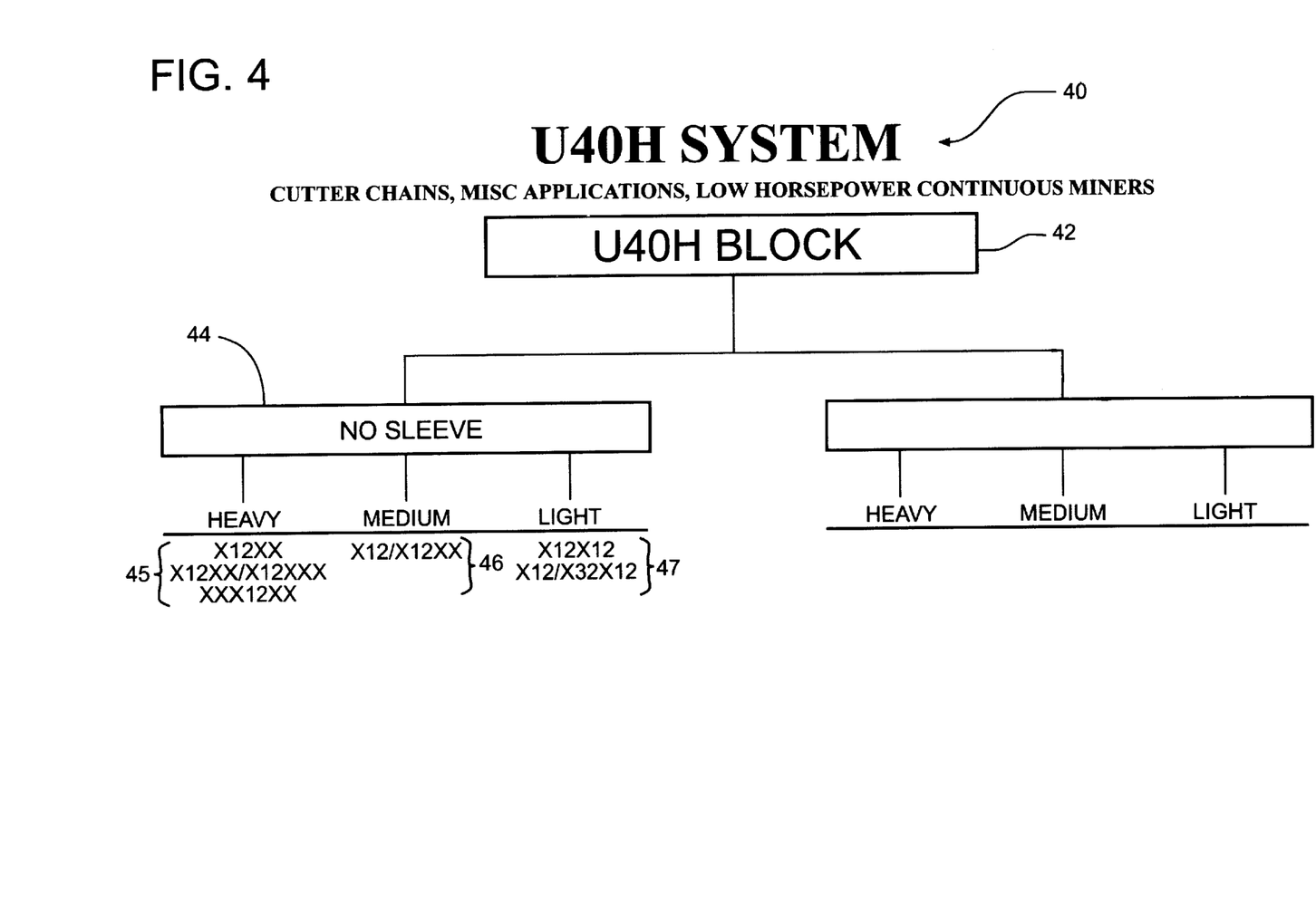

FIG. 4 shows another example of a cutting system 40, designated with an alphanumeric code U40H, for cutter chains, miscellaneous applications, and low horsepower continuous miners. The U40H system includes only one block 42, designated with an alphanumeric code U40H, and NO SLEEVE selection. Under the NO SLEEVE selection, the user may select cutting tools 45, 46, 47 for HEAVY, MEDIUM and LIGHT operation categories, respectively.

Figure 5:
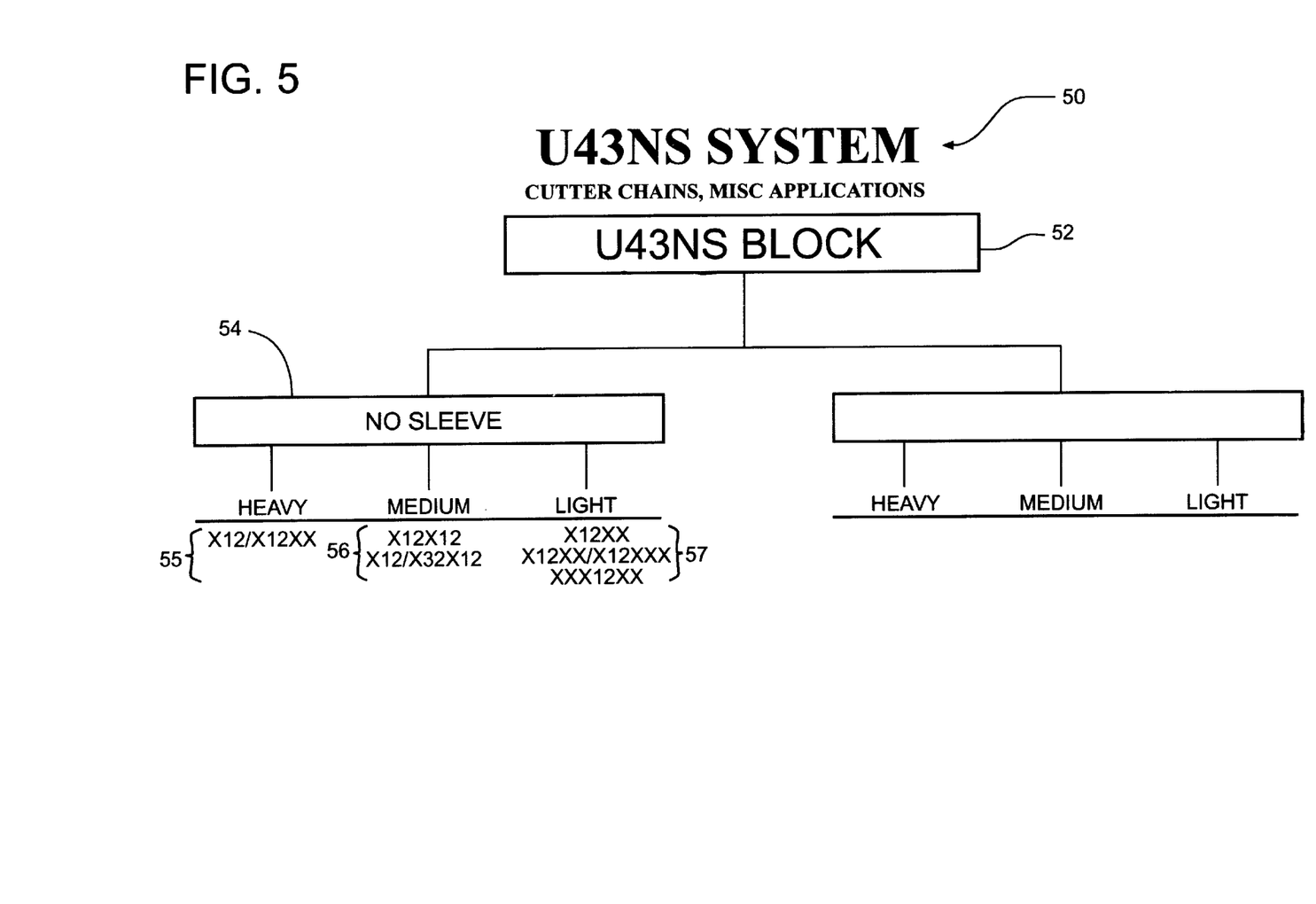
Figure 6:
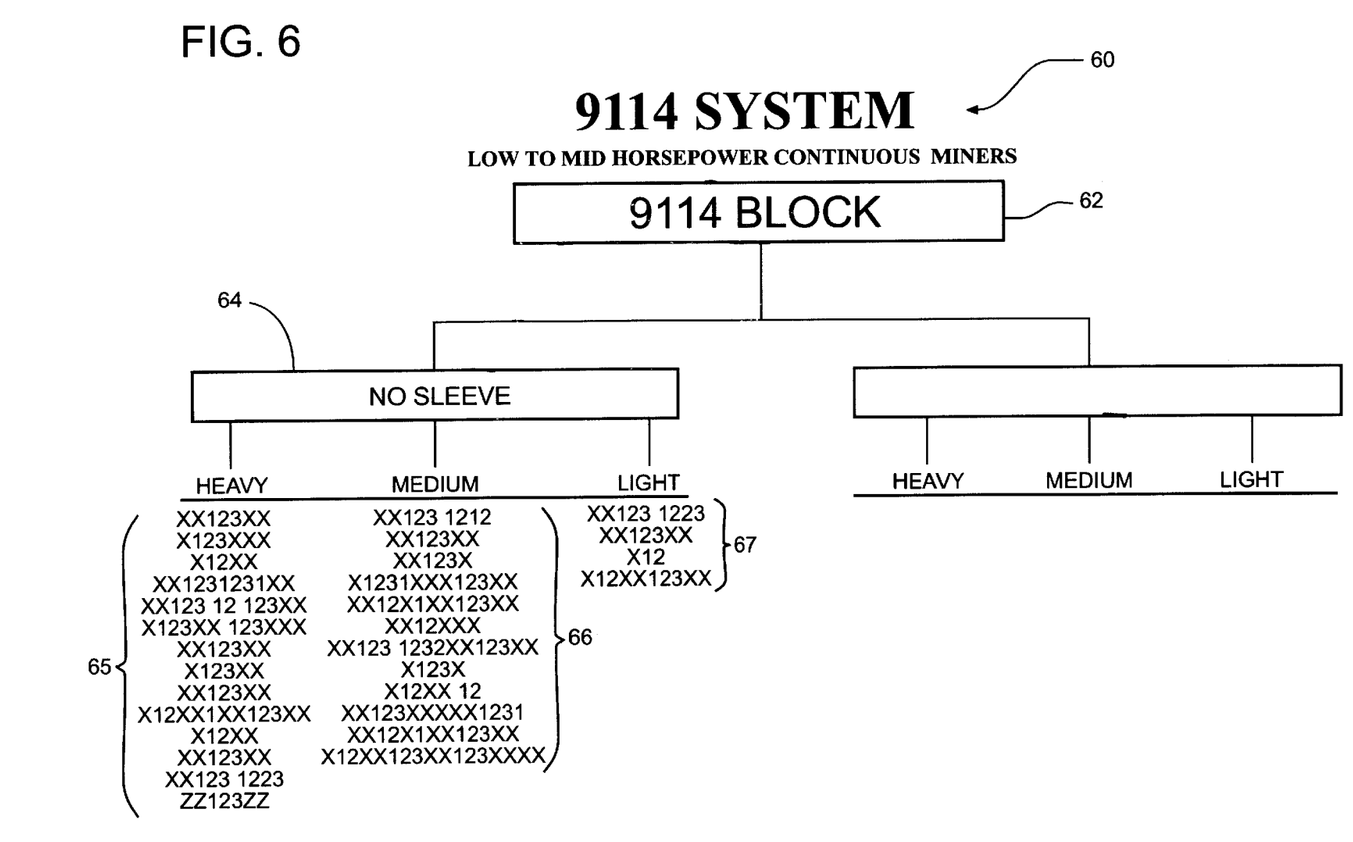
Figure 7:
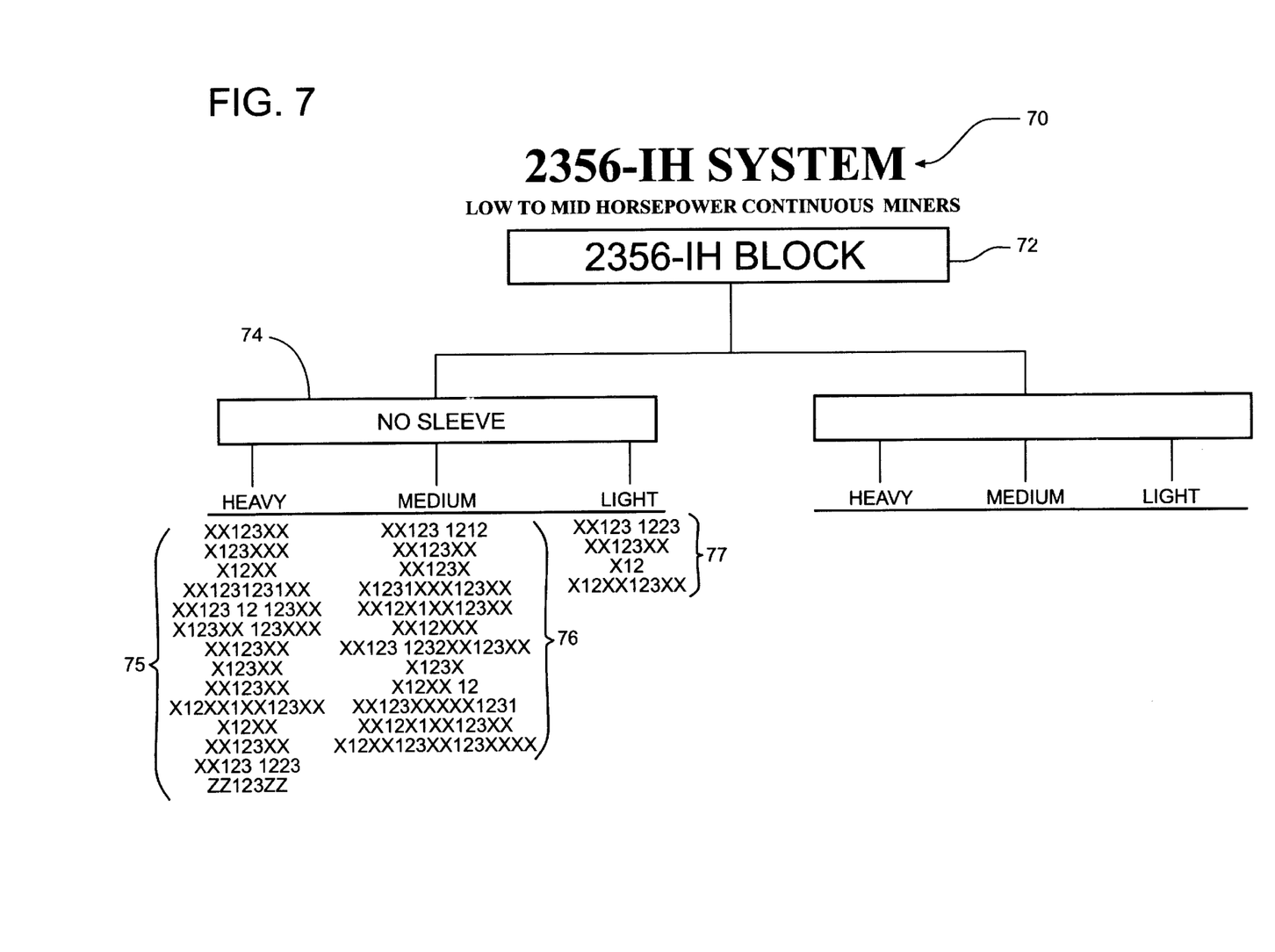

FIGS. 5, 6 and 7 show examples of cutting systems 50, 60, 70 similar to the cutting system 40 in which only one block 52, 62, 72 and one sleeve 54, 64, 74 can be selected by the user, respectively. However, the user may select cutting tools 55–57, 65–67, 75–77 for HEAVY, MEDIUM and LIGHT operation categories, respectively.

Figure 8:
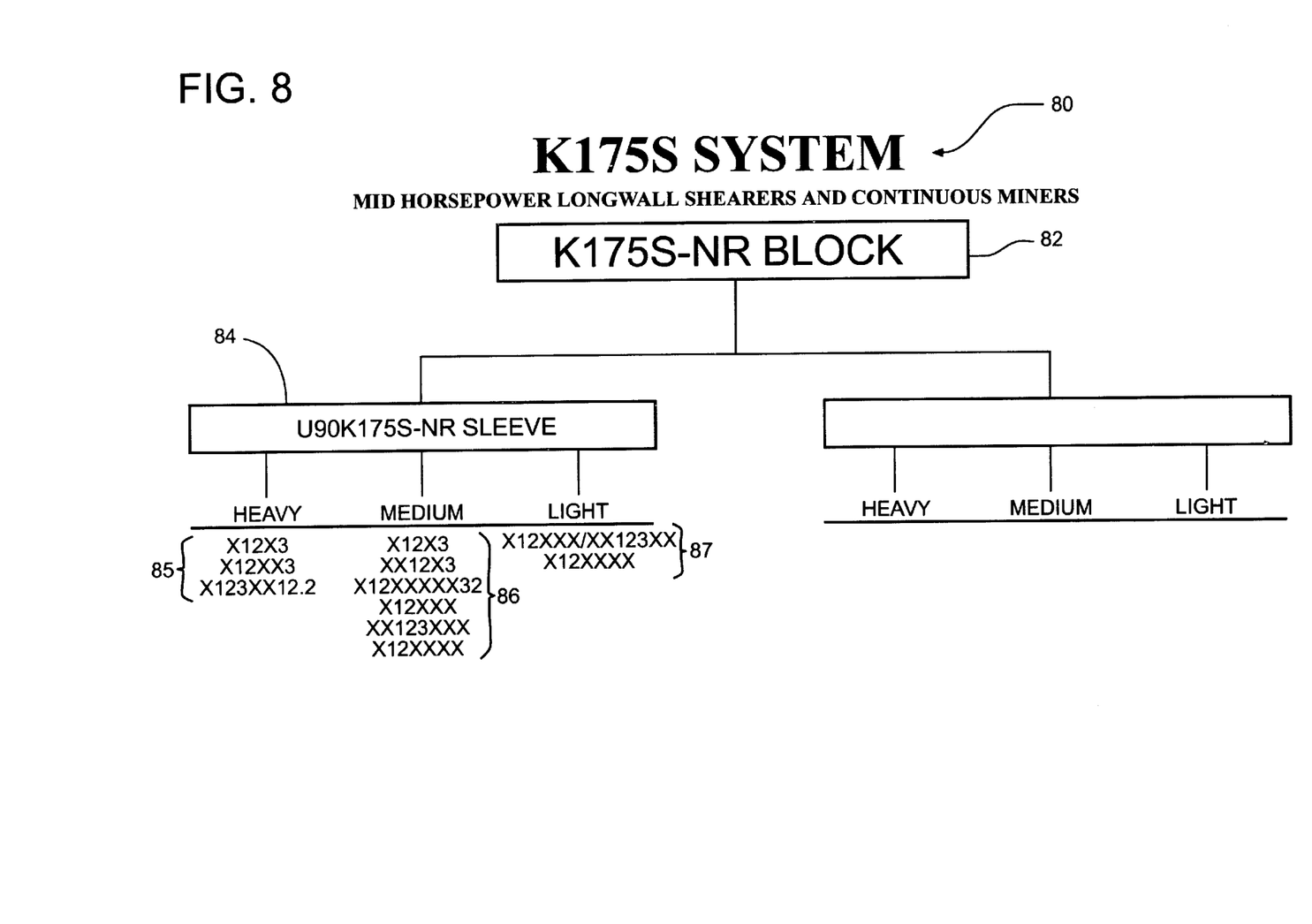

FIG. 8 shows another example of a cutting system 80, designated with an alphanumeric code K175S, for medium horsepower longwall shearers and continuous miners. The K175S system 80 includes one block 82, designated with an alphanumeric code K175S-NR, and one sleeve 84, designated with an alphanumeric code U90K175S. For the selected sleeve, the user may select cutting tools 85, 86, 87 for HEAVY, MEDIUM and LIGHT operation categories.

Figure 9:
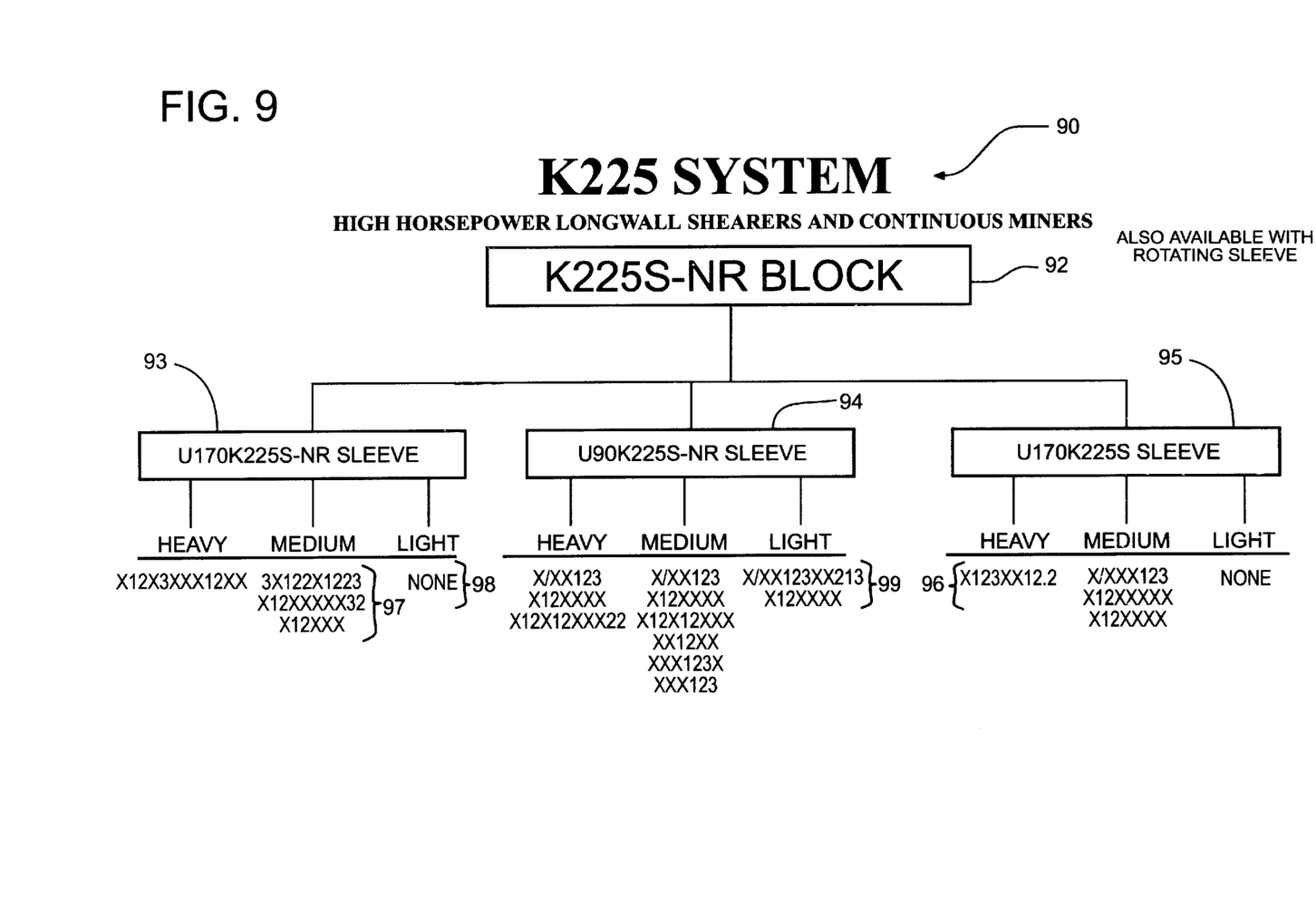

FIG. 9 shows another example of a cutting system 90, designated with an alphanumeric code K225, for high horsepower longwall shearers and continuous miners. The K225 system includes one block 92, designated with an alphanumeric code K225S-NR. Under the K225S-NR block 92, the user can select one of three sleeves 93, 94, 95, designated with the alphanumeric codes U170K225S-NR, U90K225S-NR, and U170K225S. Under the sleeves 93, 95 designated with the alphanumeric codes U170K225S-NR and the U170K225S, the user can select cutting tools 96 for a SEVERE operation category in which the cutting tools are designed for use in very dense or hard substances, such as high-density rock, granite, and the like. In addition, the user can select cutting tools 97, 98 for HEAVY and MEDIUM operation categories. For the sleeve 94 designated with U90K225S-NR alphanumeric code, the user can select cutting tools 99 from the LIGHT operation category.

It should be noted that the system is not order dependent. For example, the user can begin the method by selecting the cutting tool for the user's particular operation, optionally, selecting a sleeve for the selected cutting tool, and then selecting the block for the cutting system.

As described above, the present invention relates to a tiered level system and method that guides a user through the process of selecting an appropriate tool or adapter for specific cutting conditions and/or applications.

A cutting system can be easily selected for a user's machine from a desired operational category in accordance with the teachings of the present invention. Thus, the system and method of the invention enables the user to configure a block, sleeve and cutting tool that best fits that user's particular operation.

The patents and publications referred to herein are hereby incorporated by reference.

Having described presently preferred embodiments the invention may be otherwise embodied within the scope of the appended claims.

What is claimed is:

1. A method for selecting a cutting tool for mining and construction applications, the method comprising the steps of:

setting and registering cutting tool criteria comprising an alphanumeric code for identifying a desired cutting tool from a plurality of cutting tools appropriate for a particular mining or construction application;

arranging and displaying the cutting tool data in accordance with the registered cutting tool criteria; and selecting the desired cutting tool from among the displayed cutting tool data based upon the registered cutting tool criteria, wherein a block is selected based on a particular operation category.

2. The method of claim 1, wherein the desired cutting tool is selected based on a type of machinery.

3. The method of claim 1, wherein the particular operation category includes one of a severe, heavy, medium and light operation category.

4. The method of claim 3, wherein the desired cutting tool is selected based on a color of one of the severe, medium and light operation category.

5. The method of claim 1, wherein the desired cutting tool is selected based on a shape of the desired cutting tool.

6. The method of claim 1, wherein the desired cutting tool is selected based on a composition of the desired cutting tool.

7. The method of claim 1, wherein the cutting tool data is displayed on an Internet web page.

8. A method for selecting a desired cutting tool from a cutting tool system comprising a plurality of blocks, a plurality of sleeves for each block, and a plurality of cutting tools for each sleeve, the plurality of cutting tools categorized according to a plurality of operation categories, the method comprising the steps of:

setting and registering cutting tool criteria for the plurality of cutting tools appropriate for a particular mining or construction application;

arranging and displaying the cutting tool data comprising an alphanumeric code for identifying the desired cutting tool from the plurality of cutting tools; and selecting the desired cutting tool from among the displayed cutting tool data based upon the registered cutting tool criteria, wherein a block is selected based on a particular operation category.

9. The method of claim 8, wherein the desired cutting tool is selected based on a type of machinery.

10. The method of claim 8, wherein the particular operation category includes one of a severe, heavy, medium and light operation category.

11. The method of claim 10, wherein the desired cutting tool is selected based on a color of one of the severe, medium and light operation category.

12. The method of claim 8, wherein the desired cutting tool is selected based on a shape of the desired cutting tool.

13. The method of claim 8, wherein the desired cutting tool is selected based on a composition of the desired cutting tool.

14. The method of claim 8, wherein the cutting tool data is displayed on an Internet web page.

* * * * *